Jan. 27, 1925.  1,524,186
C. E. LOWE
MANDREL FOR TIRE TUBES
Filed Aug. 21, 1922
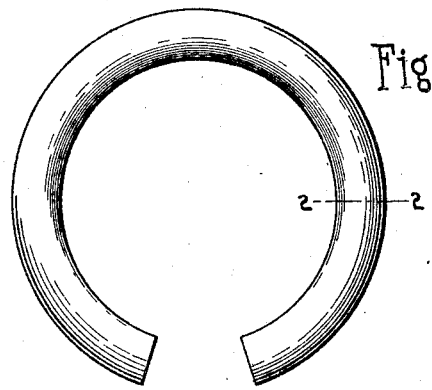
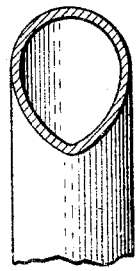
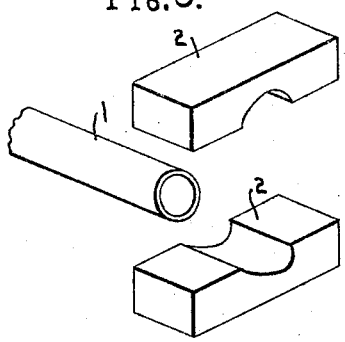
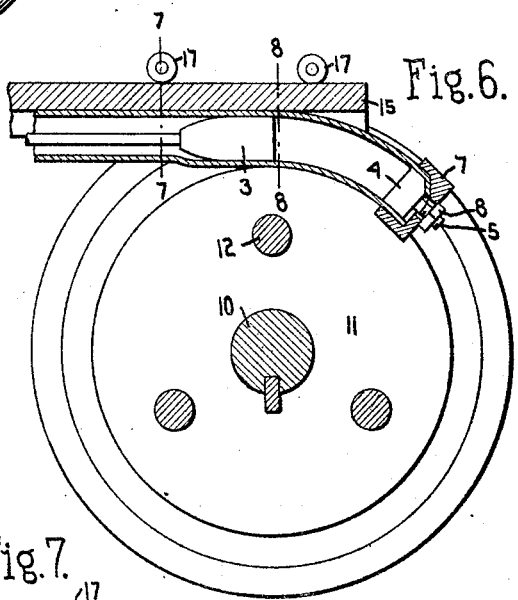
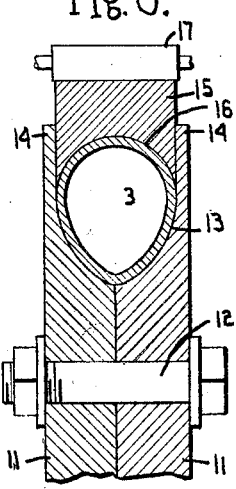
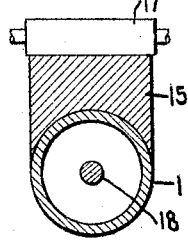
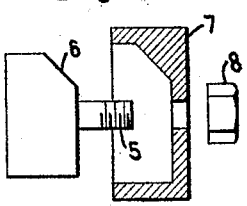
INVENTOR.
Clyde E. Lowe
BY
ATTORNEY.

Patented Jan. 27, 1925.

1,524,186

UNITED STATES PATENT OFFICE.

CLYDE E. LOWE, OF CLEVELAND, OHIO.

MANDREL FOR TIRE TUBES.

Application filed August 21, 1922. Serial No. 583,341.

*To all whom it may concern:*

Be it known that I, CLYDE E. LOWE, a citizen of the United States, residing at Cleveland, in the county of Cuyahoga and State of Ohio, have invented a certain new and useful Improvement in Mandrels for Tire Tubes, of which the following is a full, clear, and exact description, reference being had to the accompanying drawings.

This invention relates to the manufacture of pneumatic tire tubes and has for its purpose the provision of a seamless, rigid, curvilinear, discontinuous, hollow mandrel for the forming and curing of inner tubes of pneumatic tires which shall fit the casings more exactly than previous tubes. Owing to the impossibility of securing any other kind of mandrel such tubes have always heretofore been made of circular cross section, while the casings in which they are used are ordinarily of an ovate cross section which leads to wrinkling of the tube at the innerside with all the attendant disadvantages. The main object of my invention is the provision of a new and improved type of mandrel which shall possess the shape desired, shall be smooth and seamless, shall be light and of small heat capacity, and shall be inexpensive. Other objects of the invention are the provision of a new and improved process for producing such a mandrel; while further objects and advantages will become apparent as the description proceeds.

In the drawings accompanying and forming a part of this application I have shown my improved mandrel together with the preferred process and apparatus for producing the same, although it will be understood that these drawings are intended to be merely illustrative and not limiting upon me. Fig. 1 illustrates a complete mandrel embodying my improvements; Fig. 2 is a sectional view corresponding to the line 2—2 of Fig. 1; Fig. 3 illustrates the first step of the process; Figs. 4 and 5 illustrate the preferred form of clamping member employed in the succeeding step; Fig. 6 illustrates the preferred form of bending and forming machine; and Figs. 7 and 8 are sectional views corresponding to the lines 7—7 and 8—8 respectively of Fig. 6.

My improved tire-mandrel consists of a hollow wrought-metal tube bent to circular form but subtending slightly less than 360°, each portion of said mandrel being ovate in cross section with its smaller end inward. This mandrel is preferably made from a single piece of seamless tubing so that the tubes cured thereon shall be smooth and uniform while their ovate section combined with their curvilinear shape enables the ends to be brought together and cemented into an endless tube which exactly fits a tire casing without twisting, wrinkling, or stretching.

The preferred mode of producing this mandrel from an ordinary seamless tube is as follows: A cylindrical tube 1 of suitable length, thickness and diameter is inserted between dies 2—2 of approximately the desired shape, but only for a sufficient distance from the end to enable the insertion of a spreader or triplet 3 and a plug 4. This plug consists of a body portion adapted to fit substantially into the end of the mandrel, one face of the same having a longitudinally threaded stud 5 projecting therefrom and one corner adjacent said stud being cut away as at 6. Cooperating with this plug is a collar member 7 complementary thereto and adapted to receive the end of the tube after which the collar is clamped thereon by a suitable nut 8.

The tube is then simultaneously formed and bent in the following manner: Rigidly keyed to a shaft 10 is a split spool made of side pieces 11 secured together by bolts 12 and having a peripheral groove 13 corresponding in contour to that portion of the mandrel which lies inside its region of greatest thickness. Outside this point the lips of the spool preferably project in the form of flat sided flanges 14 between which is mounted the longitudinally movable bar 15. The side of said bar which faces said groove is itself hollowed out in the form of a semi-cylindrical channel 16 which substantially fits the tube 1, and the other side preferably runs against suitable anti-friction rollers 17—17. At one point in the periphery of the spool the walls of the groove are notched for the reception of the clamp 7. The triplet is rigidly attached to a rod 18 suitably secured to some part of the machine frame so as to hold the triplet stationary between the spool and follow bar. As shown in Fig. 8, the triplet 3 has the exact contour of the interior of the mandrel.

The end portion of the tube 1 having been suitably shaped by the dies 2—2, the triplet 3 and plug 4 are inserted therein after which the end of the tube is hammered over the notch 6 and the clamp 7 fastened thereon by the nut 8. The tube is then introduced into the groove of the spool, the follow bar applied, and the rod 18 fastened against movement, after which the spool is slowly rotated so as to draw the tube past the triplet, simultaneously imparting thereto the circular shape and ovate section desired. It is then removed by taking the spool apart, removing the clamp 7 and either restoring the bent portion to an even surface or sawing off the end.

It will be understood that I do not limit myself to this exact curvature of my improved mandrel, nor to any exact angular extent, neither do I restrict myself to this exact process of making the same, nor do I limit this process to the making of mandrels of this cross section only; nor do I limit myself in any other manner except as specifically recited in the annexed claims. It is noted, however, that a sheet metal mandrel is far superior to a cast iron one owing to its higher heat conductivity, and its smaller heat capacity which leads to a better curing of the tubes in addition to the greater ease of handling and that the absence of seams and welding produces greater uniformity.

Having thus described my invention, what I claim is:

1. A seamless wrought-metal mandrel for tire tubes having a curvilinear form subtending the greater part of a circle but less than 360°, each portion of said mandrel being ovate in cross-section with its smaller end inward.

2. A hollow one piece metal mandrel for tire tubes made in curvilinear form, each portion of said mandrel being ovate in cross section with its smaller end at the inside of the curve.

3. A seamless wrought mandrel, for tires and tire tubes and similar articles, having a curvilinear form and an ovate cross section.

4. A seamless wrought mandrel, for tires and tire tubes and similar articles, having a curvilinear form, subtending the greater part of a circle, and having an ovate cross section.

5. A seamless wrought mandrel, for tires and tire tubes and similar articles, having a curvilinear form, subtending the greater part of a circle but not a complete circle, and having an ovate cross section.

6. A seamless wrought mandrel, for tires and tire tubes and similar articles, having a curvilinear form, and an ovate cross section formed with the small end of the oval directed inwardly.

7. A seamless wrought mandrel, for tires and tire tubes and similar articles, having a curvilinear form, subtending the greater part of a circle, and having an ovate cross section with the smaller end of the oval directed inwardly.

8. A seamless wrought mandrel, for tires and tire tubes and similar articles, having a curvilinear form, subtending the greater part of a circle but not an entire circle, and having an ovate cross section with the smaller end of the oval directed inwardly.

9. A hollow one-piece mandrel, for tires and tire tubes and similar articles, having a curvilinear form and an ovate cross section.

10. A hollow one-piece mandrel, for tires and tire tubes and similar articles, having a curvilinear form, subtending the greater part of a circle, and having an ovate cross section.

11. A hollow one-piece mandrel, for tires and tire tubes and similar articles, having a curvilinear form, subtending the greater part of a circle but not the complete circle, and having an ovate cross section.

12. A hollow one-piece mandrel, for tires and tire tubes and similar articles, having a curvilinear form and an ovate cross section formed with the small end of the oval directed inwardly.

13. A hollow one-piece mandrel, for tires and tire tubes and similar articles, having a curvilinear form, subtending the greater part of a circle, and having an ovate cross section with the smaller end of the oval directed inwardly.

14. A hollow one-piece mandrel, for tires and tire tubes and similar articles, having a curvilinear form subtending the greater part of a circle but not an entire circle, and having an ovate cross section with the smaller end of the oval directed inwardly.

15. A mandrel for tire tubes consisting of a single seamless cold drawn metal tube of arcuate shape subtending at least about 300° of arc.

16. A seamless one-piece mandrel for tire tubes made of a single cold drawn metal tube subtending the greater part of a circle and having its ends spaced apart.

17. A mandrel for tire tubes comprising a seamless metal tube of arcuate shape subtending at least the greater part of a circle, the portions of the tube which consistute the sides of the annulus having a smaller degree of transverse curvature than the portions which constitute the inner and outer edges of such annulus.

18. A mandrel for tire tubes comprising a seamless metal tube of oblong cross section formed into an arc which subtends the greater part of a circle, the curvature of such arc lying in the plane of the maximum transverse curvature of the walls of the tube and said tube having portions of diminished transverse curvature facing laterally of such arc.

In testimony whereof, I hereunto affix my signature.

CLYDE E. LOWE.